US011280602B1

(12) United States Patent
Jeon

(10) Patent No.: US 11,280,602 B1
(45) Date of Patent: Mar. 22, 2022

(54) MICROMETER FOR MEASURING DIMENSION OF A CONDUCTIVE OBJECT

(71) Applicant: SEWON ELECTRONICS CO., LTD., Pyeongtaek-Si (KR)

(72) Inventor: Hong Ju Jeon, Jeonju-si (KR)

(73) Assignee: SEWON ELECTRONICS CO., LTD., Pyeongtaek-si (KR)

( * ) Notice: Subject to any disclaimer, the term of this patent is extended or adjusted under 35 U.S.C. 154(b) by 28 days.

(21) Appl. No.: 17/018,184

(22) Filed: Sep. 11, 2020

(51) Int. Cl.
*G01B 3/18* (2006.01)
*G01B 7/14* (2006.01)

(52) U.S. Cl.
CPC .................... *G01B 7/14* (2013.01); *G01B 3/18* (2013.01)

(58) Field of Classification Search
CPC .................... G01B 3/18; G01B 7/14
See application file for complete search history.

(56) References Cited

U.S. PATENT DOCUMENTS

| 4,118,867 | A | * | 10/1978 | Lendi | ..................... | G01B 3/18 33/199 R |
| 6,354,014 | B1 | * | 3/2002 | Yamakawa | ............. | G01B 3/18 33/813 |
| 8,209,873 | B1 | * | 7/2012 | Kipnes | ..................... | G01B 3/40 33/199 R |
| 2012/0203504 | A1 | | 8/2012 | Jordil et al. | | |
| 2013/0075215 | A1 | * | 3/2013 | Saito | ..................... | G01B 3/008 192/48.92 |

FOREIGN PATENT DOCUMENTS

| CN | 2444203 Y | 8/2001 |
| JP | 2005-127912 A | 5/2005 |
| KR | 10-0360478 B1 | 12/2002 |
| KR | 10-2008-0009344 A | 1/2008 |
| KR | 10-1788129 A | 10/2017 |
| KR | 10-2037634 A | 10/2019 |

* cited by examiner

*Primary Examiner* — Alesa Allgood
(74) *Attorney, Agent, or Firm* — Hauptman Ham, LLP

(57) ABSTRACT

A micrometer according to the present invention comprises: a frame of conductive material; an anvil of conductive material that is fixedly coupled to one end of the frame in an electrically insulated manner from the frame; a spindle of conductive material coupled to other end of the frame in such a way as to be moved back and forth along direction of the anvil in synchronization with rotation of a thimble while making electrical contact with the frame; and a controller configured to transmit a value for current gap between the anvil and the spindle to an external device as a measurement in case the anvil and the frame are electrically short-circuited. This configuration of the micrometer allows a measurement to be sent to the external device only in the case that a conductive object is necessarily mounted between the anvil and the spindle and electrically short-circuits them.

8 Claims, 4 Drawing Sheets

MICROMETER FOR MEASURING DIMENSION OF A CONDUCTIVE OBJECT

BACKGROUND

Field

The present invention relates to a micrometer capable of precisely measuring a dimension of an object, and more particularly to a micrometer capable of transmitting information on a measured dimension to an external device.

Description of the Related Art

These days, many kinds of devices and appliances are used in daily life, work, leisure activities or medical practices etc. of people. Most of them perform the intended operations or functions based on electrical signal exchange among their components. Particularly, a large-sized equipment, for example, a vehicle, a communication device, a medical device or the like connects many kinds of cables to each other among a large number of components to enable electrical communication among its components.

In order to easily connect many kinds of cables to connectors provided on a PCB or the like on which the components are mounted, the core wire 1 (the stripped wire) to constitute a cable is electrically connected to a metallic terminal 2 as shown in FIG. 1, and the terminal 2 is then installed into a housing.

When connecting/fastening a wire to a metallic terminal 2, crimping is generally applied. However, the crimping should be applied within the proper range of force (pressure) that is determined depending on the diameter of the wire and the type of terminal to be connected. If the crimping is made weaker or stronger than the appropriate force (pressure), problems will occur. In the former case, when the wire-connected terminal is installed in an apparatus such as a vehicle to undergo a high vibration, it may be detached from the wire because the crimping force connecting the wire to the terminal is weak. In the latter case, the joint of the wire and the terminal may be broken or the wire may be cut off. And, if the vibration is continuously applied to the apparatus in the state where the joint is broken or the wire is cut off, the electrically-contacted state may become unstable or removed as the broken joint or the disconnected wire is separated.

On the other hand, a terminal crimping tool called an applicator is used for the crimping connection with terminals for many kinds of wires. Therefore, in order to prevent the above-described problem, a worker performs a task of making a sample terminal which is press-coupled to a wire by the applicator and measuring each thickness of two sections of the sample terminal, which are pressed on the sheath and the core wire 1 respectively, using a micrometer. The thickness(es) to be measured in this manner is (are) called PH (Pressed Height) hereinafter.

The PH thus measured is provided to a POP (Point of Production) terminal, e.g., a PC constituting a POP system that is capable of collecting, analyzing and querying various production data generated on the production field in real time over a network. As a result, it is confirmed from the POP terminal whether the crimping-typed connection is made at a proper force (pressure) as compared with the recommended PH that is previously recognized by the POP terminal for the corresponding type of wire and terminal through a bar code etc. attached to a large number of wires. In general, the POP terminal registers the received PH as a measurement value for the corresponding type of wire and terminal if it is within a standard range, and rejects registration of the received PH if not.

Therefore, when the registration of the measurement value is rejected by the POP terminal, a worker adjusts the setting for the crimping height (thickness) of the applicator, presses another wire of the same type to the terminal to make another sample, and re-measures it using a micrometer. This operation is repeated until the measured PH reaches the standard range. When the measured PH comes to the standard range, the applicator is used to crimp the terminals for many wires of the same type.

The management of the PHs for the connections of every kind of wires to the corresponding terminals is essential for maintaining the quality of the contact point and for identifying the cause of the problem at the time of occurrence of the problem. However, the sample measuring works are troublesome for workers who have to deal with many kinds of wires.

Normally, because a worker repeatedly performs the same operations for many types of wires, the pressing strength to be set on the crimping tool for a given type of wire and terminal can be closely grasped by a skilled sense. Therefore, some of workers tend not to do a work that a sample must be made on trial by crimping a terminal to a single wire selected from a given type of wires, and the sample must be measured by mounting it on a micrometer. Instead, by pushing a transmission button provided on the micrometer after they move only the spindle of the micrometer without a sample of crimped terminal so that a value (corresponding to the gap between the anvil and the spindle) indicated by the micrometer is to be within the standard range indicated on the screen of the POP terminal, the PH required for crimping a terminal to that kind of wire is manipulated as if it were actually measured. Then, they set the pressure strength of the applicator by their intuition for the type of wires to be worked and use the applicator to crimp the terminal to those wires.

If such a crimping work without actual measurement of a sample is done at the production field, it is impossible to find out the cause of a problem through post analysis using the POP system when the wires crimped thus cause a problem in an apparatus due to poor crimping. This is because in the POP system, a measurement value within a standard range has been registered for the corresponding type of wires.

Therefore, for thorough quality control of the connections of the wires with the terminals, there is a need to prevent this kind of worker's deliberate non-compliance with work standard.

SUMMARY OF THE INVENTION

One object of the present invention is to provide a micrometer for transmitting a measured value to an external entity only when a conductive object is necessarily mounted thereon and actually measured.

Another object of the present invention is to provide a micrometer capable of conforming workers to a pre-specified working standards in transmitting a measured value for a conductive object to an external entity.

A yet another object of the present invention is to provide a micrometer which makes it easier to carry out measurement of a conductive object and confirm whether or not the object satisfies the dimension requirement.

The scope of the present invention is not necessarily limited to the above explicit statements. Rather, the scope of the present invention covers anything to accomplish effects that could be derived from the specific and illustrative explanations of the present invention below.

A micrometer for measuring dimension of an object in accordance with one aspect of the present invention, comprises: a frame of conductive material; an anvil of conductive material that is fixedly coupled to one end of the frame in an electrically insulated manner from the frame; a spindle of conductive material coupled to other end of the frame in such a way as to be moved back and forth along direction of the anvil in synchronization with rotation of a thimble while making electrical contact with the frame; and a controller configured to transmit a value for current gap between the anvil and the spindle to an external device as a measurement in case the anvil and the frame are electrically short-circuited wherein the current gap is tracked according to distance the spindle travels.

In an embodiment according to the present invention, the controller transmits the value for the current gap between the anvil and the spindle to the external device as a measurement if the anvil and the frame are in electrically short-circuited when a press of a provided button is detected.

In another embodiment according to the present invention, the micrometer may further comprise a supplement member, equipped with a button on one side thereof, that is structured to seat the frame fixedly wherein one of both electrical pins of the button is electrically connected to one signal line of a cable connecting the micrometer and the external device, and other pin of said both electrical pins is electrically connected to one of the anvil and the frame, said both electrical pins being electrically short-circuited when the button is pressed, and wherein other one of the anvil and the frame is electrically connected to another signal line of the cable. In the present embodiment, the controller may transmit the value for the current gap between the anvil and the spindle to the external device as a measurement when said one signal line and said another signal line are electrically short-circuited (which means that the anvil and the frame are in short-circuited state).

In an embodiment according to the present invention, the controller may conduct an automatic transmission operation that transmits the value for the current gap between the anvil and the spindle to the external device as a measurement when an electrical short-circuited state between the anvil and the frame is maintained for a predetermined time. In the present embodiment, the controller conduct the automatic transmission operation in case of a specific mode, and it transmits the value for the current gap between the anvil and the spindle to the external device as a measurement when a press of a provided button is detected if it is not in the specific mode. The controller may electrically short-circuit both particular signal lines of the cable connected to the external device when conducting the automatic transmission operation.

In an embodiment according to the present invention, the micrometer further comprises a display unit. In this embodiment, the controller displays on the display unit an error of a positive or negative value that is corresponding to difference between a standard value given for dimension of the object to be measured and a numerical value that is the measurement. In this embodiment, the standard value or the error may be received from the external device.

The present invention described above or a micrometer for measuring a conductive object in accordance with at least one embodiment of the present invention to be described in detail below with reference to appended drawings is capable of preventing a worker from intentionally avoiding actual measurement with respect to an object to be measured, thereby further improving the quality control of the measured objects.

Further, in one embodiment according to the present invention, some motions of a worker, for example, actions of pushing a measurement button, turning his eyes to a monitor or the like, which is located away from the micrometer, can be eliminated in the measuring works for conductive objects using a micrometer, thereby improving the workability and thus improving the productivity.

DETAILED DESCRIPTION*

Figure 1:
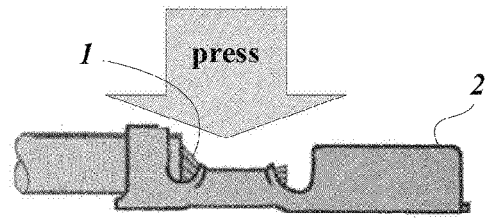
FIG. 1 shows one example of combining the end of a wire with a metallic terminal.

In what follows, embodiments of the present invention will be described in detail with reference to appended drawings.

In the following description of the embodiments of the present invention and the accompanying drawings, the same reference numerals or symbols designate the same elements unless otherwise specified. Of course, for convenience of explanation and for the sake of understanding, the same components may be indicated by different reference numbers or symbols if necessary.

Figure 2:
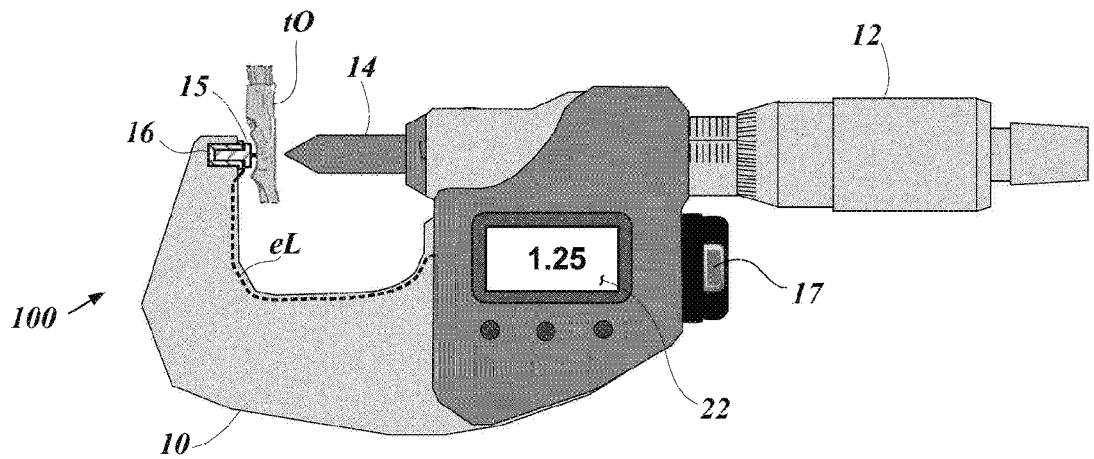
FIG. 2 is a side view showing an external shape of a micrometer configured in accordance with an embodiment of the present invention together with an object to be measured.
Figure 3:
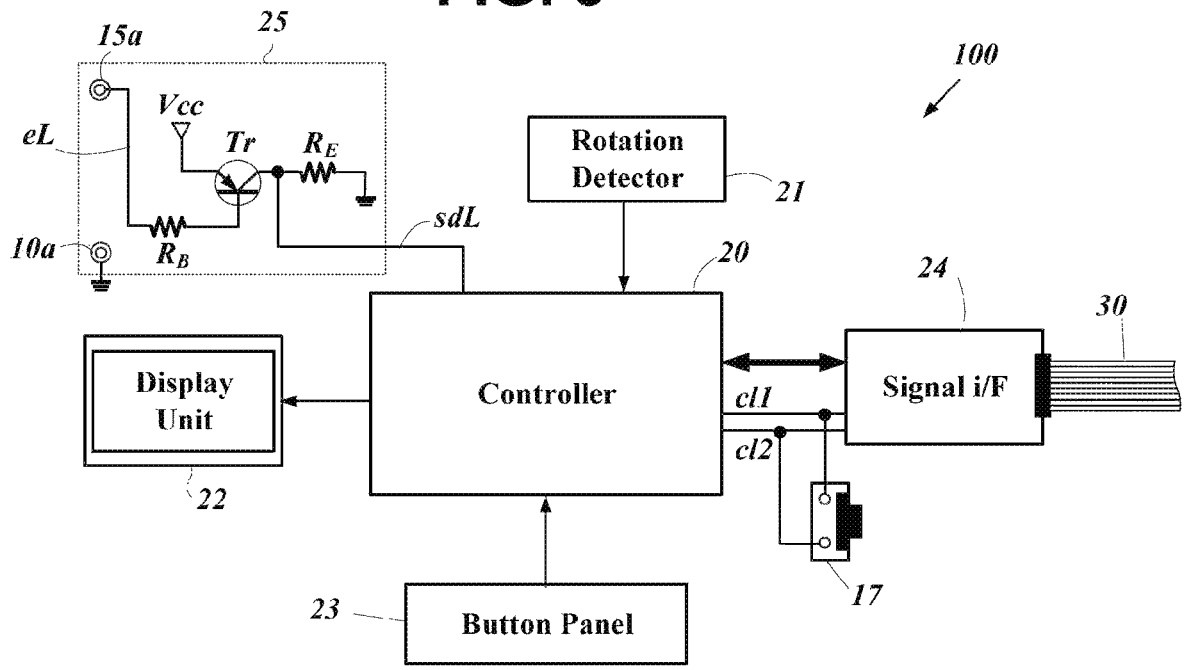
FIG. 3 is a block diagram of an electric circuitry embedded in a frame of the micrometer of FIG. 2.

FIG. 2 is a side view showing a micrometer configured according to an embodiment of the present invention, together with an object (tO) to be measured. FIG. 3 is a block diagram of an electric circuitry embedded in the frame 10 of the micrometer 100 of FIG. 2.

FIG. 2 shows the outer shape of the micrometer 100 of FIG. 2, configured according to the present invention as a simple example, that includes an anvil 15, a U-shaped or annular frame 10 fixedly supporting the anvil 15, and a spindle 14 assembled into the frame 10 in such a way as to move back and forth in the direction of the anvil 15. each of the anvil 15, spindle 14 and the frame 10 is made of conductive material. An electrical contact is maintained between the spindle 14 and the frame 10. A receptacle 16 made of insulating material is inserted into a hole formed horizontally inside the front part of the frame 10. The anvil 15 is fixed to the frame 10 while being screwed into the receptacle 16. If these requirements are satisfied, the micrometer according to the present invention may have any external shape or structure.

The electrical circuitry embedded in the internal space of the frame 10 of the micrometer 100 is configured, as illustrated in FIG. 3, to comprise: a rotation detector 21 provided in the inner space of a thimble 12 to detect the amount of rotation of the thimble 12 that a worker rotates; a display unit 22 such as a small LCD; a button panel 23 with input buttons such as hold, reset, power, mode, etc.; an interface unit 24 to which a cable 30 for signal transmission to/from the outside is connected; a Short-Circuit Detection Unit (SCDU) 25 for detecting whether the anvil 15 and the spindle 14 are in electrical short state; a transmission button 17 prepared for an input of command requesting to send a measured value for an object; and a controller 20 configured to determine a relative position of the tip of the spindle 14 away from the anvil 15 at the present time, that is, a gap between the anvil 15 and the spindle 14 by tracking the distance being moved by the spindle 14 through continuous monitoring signals transmitted from the rotation detector 21, and to display a numerical value for the determined gap on the display unit 23.

In the embodiment according to the present invention, although a method of detecting the rotation amount of the thimble 12 and converting the detected amount to the movement distance of the spindle 14 is used, any of the various known methods may be employed to track the distance moved by the spindle 14 or to directly detect the relative spacing of the spindle tip from the anvil 15.

In the SCDU 25, a signal line (eL) electrically connected to the anvil 15 via a connection terminal 15a such as a lug terminal is connected to a base of a transistor (Tr) through a resistor. Another terminal 10a, which is in electrical contact with the frame 10 at any location of the frame, is electrically connected to the ground (zero potential) of the SCDU 25. In addition, the signal line (eL) connected to the anvil 15 is preferably embedded in a groove formed along the upper curved surface of the frame, as shown in FIG. 2.

In the SCDU 25 having the circuit configuration as illustrated in FIG. 3, a loop for flowing current is made at the base of the transistor (Tr) when the anvil connection terminal 15a and the frame contacting terminal 10a are electrically shorted, so that a current flows as the transistor (Tr) is turned on. As a result, a sensing line (sdL) connected to the collector of the transistor (Tr) becomes a HIGH level corresponding to logic one. On the contrary, in the condition that the anvil connection terminal 15a and the frame contacting terminal 10a are electrically open, the transistor (Tr) is in the off-state and thus no current flows, so that the sensing line (sdL) maintains LOW level indicating logic zero.

Figure 4:
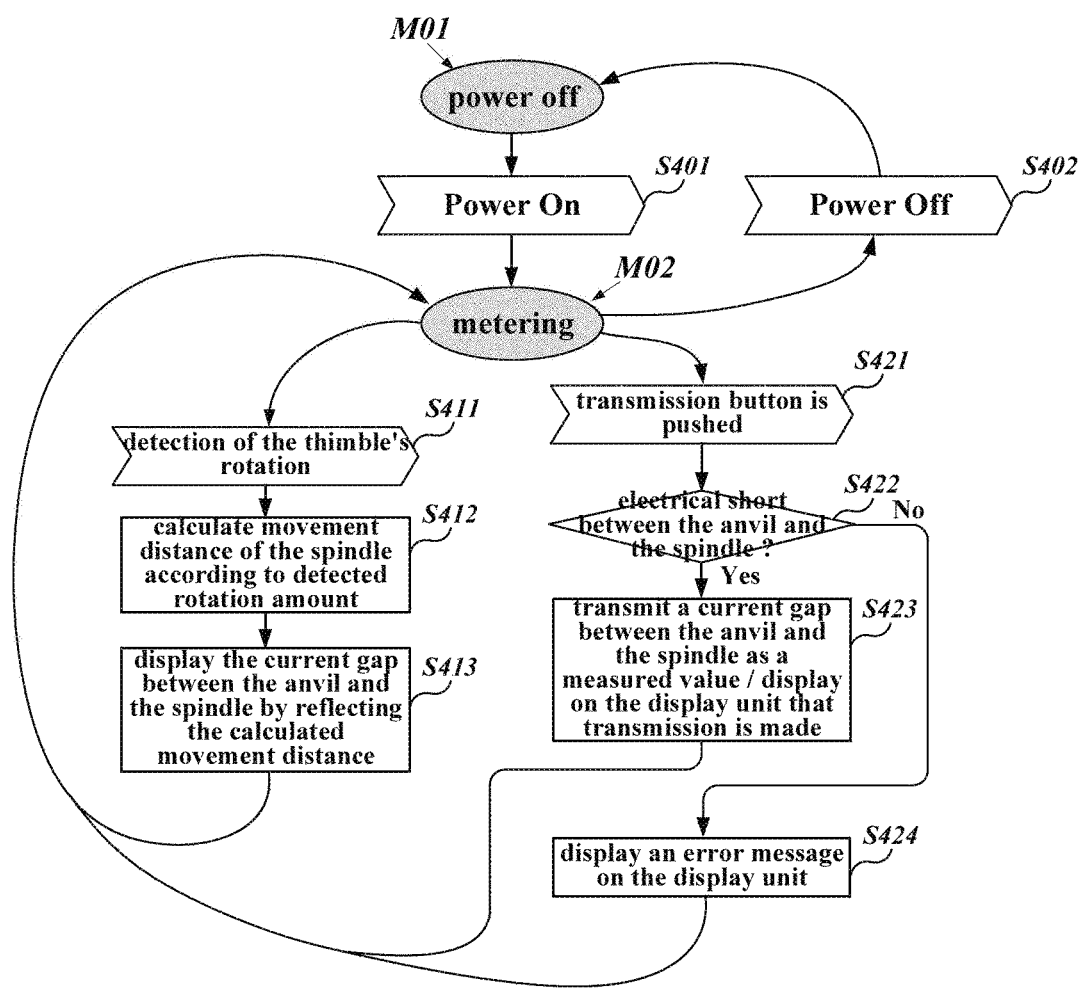
FIG. 4 is a state diagram for operations to provide a measurement to another device when a conductive object is actually mounted and measured, according to an embodiment of the present invention.

In connection with the measurement works of a worker, operations that the micrometer 100 configured as described above conducts according to the state flow diagram illustrated in FIG. 4 to measure the dimension of a conductive object and transmit a measured value to the outside will be described in detail hereinafter.

When a power switch is turned on (S401), the micrometer 100 supplied with power from a mounted battery enters the metering mode M02 from the power-off mode M01.

In this metering mode M02, while a worker rotates the thimble 12, the spindle 14, which is engaged with the thimble 12 in screw-typed manner, moves in the direction (or opposite direction) of the anvil 15, and the rotation detector 21 applies a signal indicating how much the thimble 12 is rotated to the controller 20. When the rotation amount of the thimble 12 is detected as such (S411), the controller 100 calculates a spindle movement distance corresponding to the detected rotation amount by reflecting a preset screw pitch of the spindle (S412). Then, the current gap between the anvil and the spindle is calculated by reflecting the calculated distance, and the numerical value for the calculated gap is provided to the display unit 23 to be displayed on the screen (S413). These operations continue while a worker is rotating the thimble 12.

If necessary, after turning on the micrometer 100, a worker may request initialization to match a value displayed on the display unit 23 with the gap between the anvil and the spindle. For example, a worker may press a button such as a 'reset' prepared on the button panel 23 after rotating the thimble to bring the spindle into contact with the anvil. At this time, the controller 20 sets a value indicating the gap, which is being tracked, between the anvil and the spindle to zero.

If a worker pushes the transmission button 17 in the metering mode M02 (S421), the controller 20 checks whether the anvil 15 and the spindle 14 (in fact, the frame 10 being in electrical contact with the spindle 14) are electrically shorted at the present (S422). That is, checking whether a value read from a signal of the sensing line (sdL) is logical one is made as described above.

If a worker rotates the thimble 12 with a conductive object, namely, a crimped terminal (tO) connected with a wire by crimping, placed at the side of the anvil 15 as illustrated in FIG. 2, so that the tip of the spindle 14 contacts the crimped terminal (tO), an electrical path is formed between the anvil 15 and the spindle 14 via the crimped terminal (tO) in contact with them. In other words, an electrical short between the anvil connection terminal 15a and the frame contacting terminal 10a causes the sensing line (sdL) to be in logic one as explained before.

If it is confirmed in this way that the anvil and the spindle are electrically shorted when a worker pushes the transmission button 17, the controller 20 transmits a value (namely, a measured PH) of the current gap, which is being tracked depending on the rotation amount of the thimble, between the anvil and the spindle to an external device through the interface unit 24 (S423). This transmission is made in accordance with the signaling method and format agreed previously with the external device, for example, a POP terminal.

According to an embodiment of the present invention, the interface unit 24 may convert data input from the controller 20 into signals according to a predetermined signaling method and then transmit the same. Of course, the signals received in the reverse direction may be converted into data and then transmitted to the controller 20 by the interface unit 24.

In the measurement of an object, if a worker is aware that the measurement requires electrical short between the anvil and the spindle (actually the anvil and the frame), he or she may keep a conductive object, such as a wire, etc. in contact between the anvil and the frame in order to avoid an actual measurement for many samples. In this condition, as mentioned in the conventional problem, it is also possible to transfer a measurement to an external POP terminal by moving only the spindle without actually measuring an object.

Therefore, in one embodiment according to the present invention, the controller 20 measures a time from the time when the anvil 15 and the spindle 14 are electrically shorted (that is, when the sensing line (sdL) becomes logic one), and outputs a warning sound through a prepared buzzer, etc. if the measured time exceeds a predetermined time limit, for example, ten seconds.

Further, in one embodiment according to the present invention, the frame 10 may be covered with a case of non-conductive material in order to prevent a worker from transmitting a measurement by pushing the transmission button 17 without actually mounting a sample to be measured while a wire or the like is intentionally kept being in contact with the anvil and the frame. In addition, a thin film of non-conductive material may be formed on the surface of the frame and the spindle except for its tip that comes into contact with the anvil.

On the other hand, in one embodiment according to the present invention, two signal lines cl1 and cl2, which become electrically shorted when the transmission button 17 is pressed, constitute a part of the cable 30 connected to the interface unit 24. Therefore, when a worker pushes the transmission button 17, not only the controller 20 but also a counterpart device, for example, the POP terminal connected through the cable 30 can detect that the two signal lines cl1 and cl2 change to a short-circuited state. By detecting such level change between the two signal lines cl1 and cl2, the POP terminal can know in advance that a measurement is to be received through other signal lines of the cable 30. Of course, it is also possible to separate the two signal lines cl1 and cl2 to be shorted on pushing the transmission button 17 from the cable 30. In this case, the controller 20 includes an additional circuit element that causes specific signal lines of the cable 30 to be electrically shorted when it is confirmed from the two signal lines cl1 and cl2 connected to the transmission button 17 that the button 17 is pushed.

If a worker pushes the transmission button 17 without placing a sample terminal crimped with a wire, the anvil 15 and the spindle 14 are electrically open, that is, they are electrically disconnected. Accordingly, the controller 20 confirming that the sensing line (sdL) is logic zero does not transmit a current measurement value (namely, numerical value of the gap between anvil and the spindle) through the interface unit 24. Then, it displays an error message, which may indicate that an object to be measured is not properly placed, on the display unit 22 (S424).

By the above-explained operations of the micrometer 100, intentional avoidance of worker's measurement for samples can be prevented.

Figure 5:
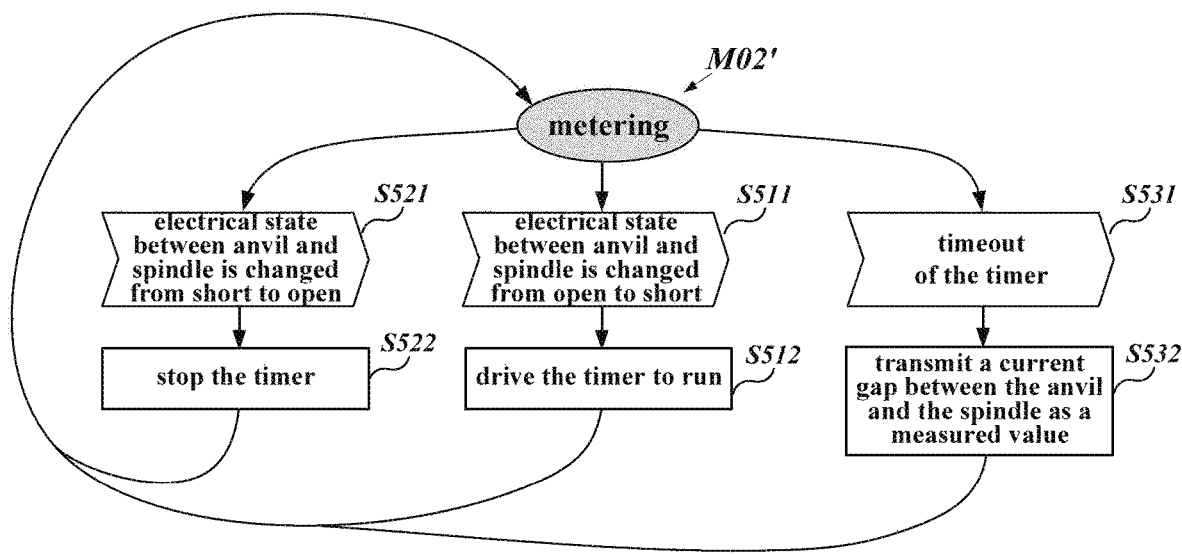
FIG. 5 is a state diagram for operations to automatically provide a measurement to another device in case that a conductive object has been actually mounted for a predetermined time according to another embodiment of the present invention.

In one embodiment according to the invention, a measured value for a conductive object may be automatically transmitted to an external device, for example, a POP terminal. FIG. 5 is a state diagram of the micrometer 100 according to the present embodiment.

Although not shown in the state diagram of FIG. 5, while the rotation of the thimble is detected, the calculation of the movement distance of the spindle and the tracking the gap between the anvil and the spindle are still conducted in the metering mode M02'.

In the metering mode M02', a worker places a conductive object such as a crimped terminal to be measured to contact with the anvil 15, and then rotates the thimble 12 so that the tip of the spindle 14 contacts with the conductive object. As a result, the SCDU 25 notifies the controller 20 by level change of the sensing line (sdL) that the electrical state between the anvil and the spindle is changed from open to short (S511).

Accordingly, the controller 20 sets a predetermined time, for example, a time of several hundred msec to a timer for knowing the elapsed time of the short circuit maintenance and drives the timer to run (S512).

In one embodiment according to the present invention, the controller 20 may output a specific sound through a buzzer or the like while the driven timer is counting time (decreasing the set time). The specific sound allows a worker to audibly recognize that a sample to be measured is in stable contact with both the anvil and the spindle.

When the timer expires (in the embodiment where a specific sound is output, the sound output is terminated at this time.) after being driven in the metering mode M02' (S531), the controller 20 transmits a numerical value corresponding to a current gap between the anvil and the spindle, which is being tracked depending on the distance the spindle travels, to an external device as a measured value through the interface unit 24 as described above. The controller 20 then displays on the display unit 22 information (e.g., "transfer OK") indicating that the measured value has been transmitted (S532). Alternatively, an audible sound, which is different from the specific sound output as soon as the timer is driven, may be output when the measured value is transmitted. In this embodiment, a worker can concentrate his/her gaze only on mounting a sample and rotating the thimble because whether a measured value is transmitted can be known through auditory perception.

If the SCDU 25 informs via the sensing line (sdL) that electrical state between the anvil and the spindle have been switched from short-circuit to open (S521) before the timer expires, the controller 20 stops the timer counting the elapsing time (S522) so that time-out does not occur. Of course, in the embodiment in which a specific sound is output in a shorted state, the output of that sound is terminated at this time.

By the operations of the micrometer 100 described with reference to the state diagram of FIG. 5, if a conductive object such as a crimped terminal keeps being in contact with both the anvil and the spindle for the time set in the timer, a measured value is automatically transmitted to an external device even if a worker does not take action of pushing the transmission button prepared on the micrometer 100. Such automatic transmission of a measured value makes the measurement work more convenient to a worker.

In one embodiment according to the invention, with respect to the aforementioned time to be set in the timer for which a worker has to keep a conductive object contacting both the anvil and the spindle therebetween for the automatic transmission of a measured value, the controller 20 can change to an appropriate time according to a user's command through a specific button prepared on the button panel 23.

In addition, in one embodiment according to the present invention, the above-described automatic transmission of a measured value may be conducted only when a worker sets the micrometer 100 to the 'auto mode' through a mode setting button provided on the button panel 23.

Figure 6:
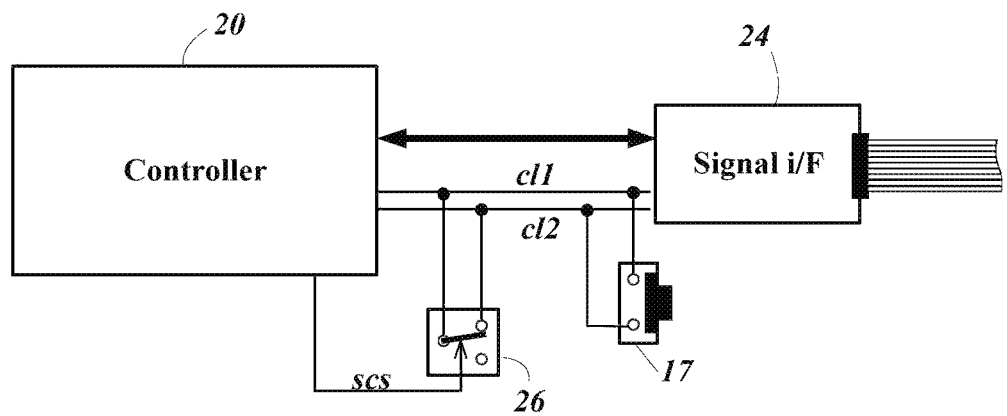
FIG. 6 shows an electrical circuit additionally prepared for informing an external device connected via a cable of transmission of a measured value by changing the level of a specific signal line of the cable in the embodiment according to FIG. 5.

On the other hand, in the case that it is necessary, as described above, to notify the external device, for example a POP terminal, which the cable 30 is connected to, by short-circuiting both signal lines cl1 and cl2 of the cable 30 that the transmission of a measured value of the micrometer 100 is started, the electrical circuitry of the micrometer 100 further comprises a switching element 26 being capable of short-circuiting the specific both signal lines cl1 and cl2 depending on a control signal (scs) from the controller 20, as illustrated in FIG. 6.

In the embodiment according to FIG. 6, the controller 20 temporarily short-circuits the specific signal lines cl1 and cl2 of the cable, and then opens them again by applying a control signal (scs) to the switching element 26 before transmitting a measured value to an external device automatically since the electrically-shorted state between the anvil and the spindle is maintained for a predetermined time.

In one embodiment according to the present invention, not only a measured value is to be transmitted but also information about a standard range for a current sample of crimped terminal to be measured is to be received in compliance with a communication method promised with an external device, e.g., a POP terminal connected to the micrometer 100 via the cable 30. In the present embodiment, when a start button prepared additionally on the micrometer 100 is pushed by a worker, the controller 20 detects that the button is pushed and transmits a signal indicating start of measurement to a counterpart POP terminal through the interface unit 24. Alternatively, the aforementioned transmission button 17 may be used for this purpose.

When the controller 20 transmits the signal indicating start of measurement to the POP terminal, the POP terminal transmits information on the standard PH or the standard range of PH related to the crimped terminal to be measured as a response to the start signal. Receiving this information through the interface unit 24, the controller 20 displays the received information on the display unit 22.

In this state, if a worker starts measurement by actually placing a sample of crimped terminal to be measured, the controller 20 checks whether the anvil and the spindle are electrically shorted. In case of short-circuited state, a numerical value of the gap between the anvil and the spindle at that time is transmitted to the external device as a measured value and displayed on the display unit 22 at the same time. If there is an error compared with the standard PH or the standard range that is received from the external device, the controller 20 displays the error as well.

If there is an error, a worker can immediately notice whether the adjustment of pressing strength of the applicator, which is used to crimp the corresponding type of wires and terminals, should be made a little stronger or weaker depending on whether the displayed error is positive or negative.

In this way, because a worker can immediately know, through the display unit 22 prepared on the micrometer 100, whether the PH of a crimped terminal sample is within the standard range, or whether the crimping has been done stronger or weaker when the PH is out of the standard range, he or she can complete the PH measurement on the sample without turning his/her gaze to the POP terminal. This improves the workability in sample measurements of workers.

Even in the above-described embodiment, in case that the micrometer 100 transmits a measured PH of a mounted sample to the external POP terminal after confirming the electrical short between the anvil and the spindle when a worker pushes the transmission button, the POP terminal may transmit information to the micrometer 100 as to whether or not the received measured value conforms to the standard value or the standard range specified for the crimping of the corresponding type of wire and terminal. For example, a response letter such as "OK" may be transmitted to the micrometer 100 if the received PH value is equal to the standard value or meets the standard range, and if it does not match, a positive or negative value indicating the error may be transmitted to the micrometer 100.

When the result information on the measured value is received through the interface unit 24 from the POP terminal, the controller 20 displays the result information on the display unit 22. When the measurement result is displayed on the display unit 22 of the micrometer 100, a worker can immediately notice, without turning his/her gaze to the screen of the POP terminal as described above, whether to complete the sample measurement or to measure a new sample made after adjusting the crimping force of the applicator more strongly or weakly.

In another embodiment according to the present invention, a supplement member that an existing micrometer is accessorily equipped with also makes it possible that a measured value of a conductive object is transmitted to an external device only when an electrical short between the anvil and the spindle is confirmed.

Figure 7A:
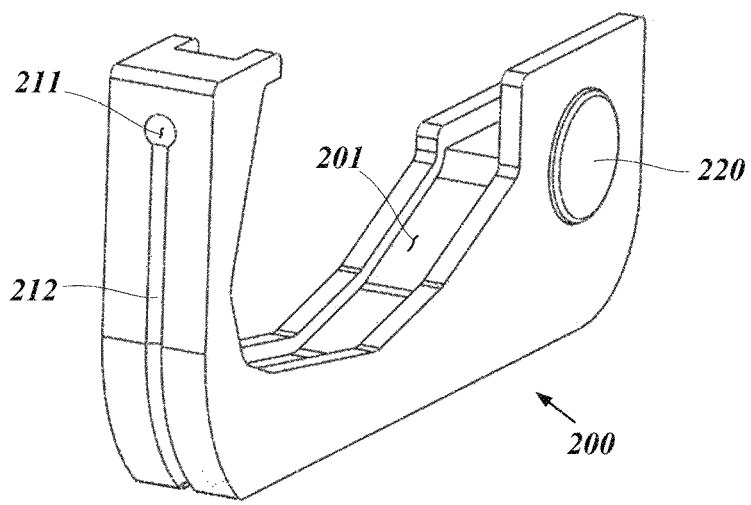
FIG. 7A is a perspective view of a supplement member that seats a conventional micrometer and enables the seated micrometer to transmit a measured value to an external device when the actual measurement of a conductive object to be measured is confirmed, in accordance with another embodiment of the present invention.
Figure 7B:
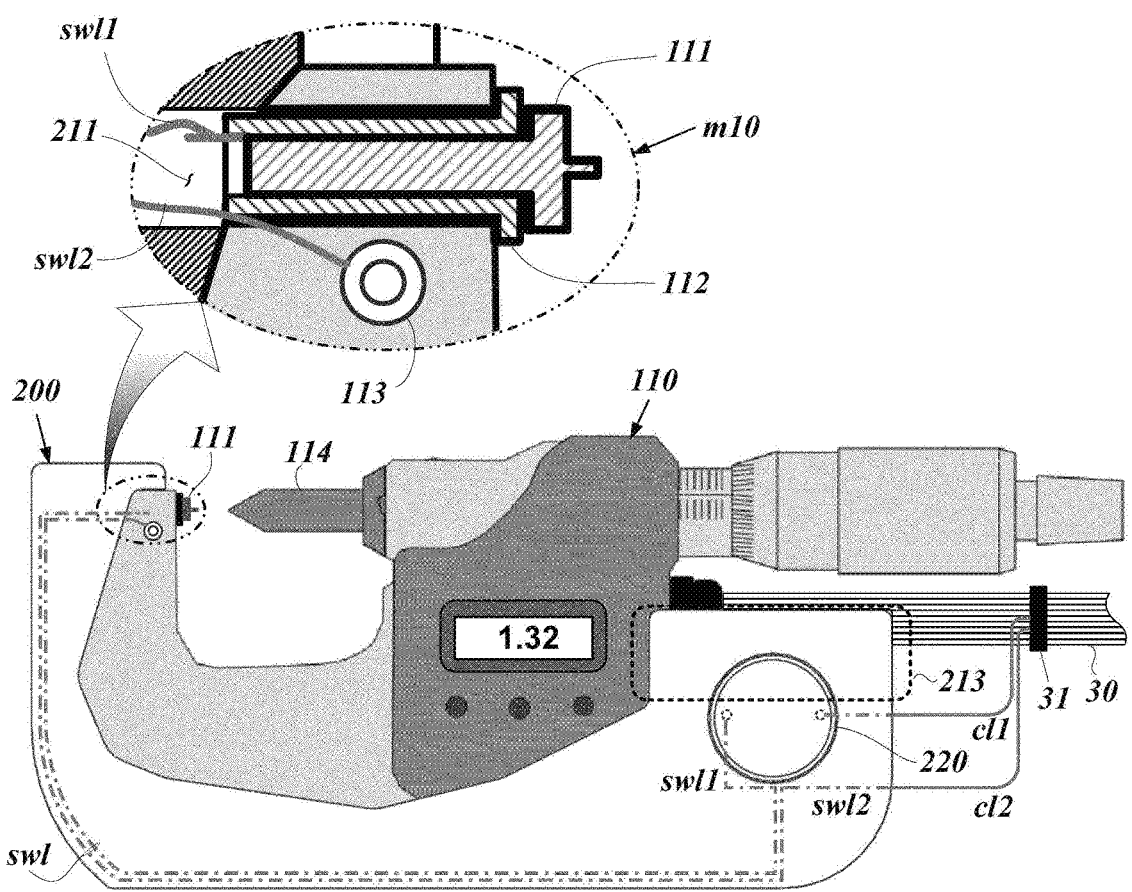
FIG. 7B shows a side view of a conventional micrometer together with an enlarged cross-sectional view of a part thereof regarding the combined form in which the micrometer is partially modified in structure and is seated on the supplement member of FIG. 7A.

FIG. 7A is a perspective view illustrating a structure of a supplement member (hereinafter, referred to as a "station unit") that seats a conventional micrometer, which transmits a measured value unconditionally without confirmation of the electrical short between the anvil and the spindle when the transmission button is pushed, thereon and allows a measured value to be transmitted to a cabled external device in the event of an electrical short between the anvil and the spindle of the conventional micrometer. FIG. 7B is a side view when a conventional micrometer 110 is mounted on the station unit 200.

In the station unit 200, a seating groove 201, which has a structure capable of accommodating a lower portion of an existing micrometer to be mounted, is formed at an inner portion on the upper part of the station unit 200, and an opening 211 is formed horizontally at the front tip thereof. A guide groove 212 capable of accommodating an electric wire is formed long in the front and bottom surfaces of the station unit 200 such that it extends to the opening 211. In addition, the station unit 200 is provided with a wide plate portion 213 that can cover the transmission button prepared on the conventional micrometer 110 when it is mounted thereon. The wide plate portion 213 serves to prevent the transmission button prepared on the conventional micrometer 110 from being touched in the direction of a worker.

In addition, it is premised that the conventional micrometer 110 to be mounted on the station unit 200 has a mechanical configuration in which the spindle and the frame are in electrical contact with each other, and an electrical circuit configuration in which both specific signal lines of the cable connected to an external device become short-circuited when the transmission button prepared thereon is pushed. For a conventional micrometer that satisfies this premise, its structure is partially modified (m10) as illustrated in FIG. 7B. More specifically, after forming a through hole in a portion where the anvil 111 is to be fastened and inserting an insulator 112 with conductive film inside thereof, e.g., an insulated lug terminal into the formed through hole, the anvil 111 is inserted into the receiving opening of the insulator 112 so that the anvil and the frame are electrically insulated by the insulator 112. Further, a hole is formed adjacent to the anvil 111 on the side of the frame, and a fastener 113, such as a screw of a conductive material, is inserted into the hole so that a wire may come to be in electrical contact with the frame.

Of course, if there is an existing micrometer that has already met the structure to be changed as described above and thus its structure does not need to be changed, such an existing micrometer may be mounted on the station unit 200 after the electrical connection to be described below is made without changing its structure.

In the guide groove 212, a wire (swl) consisting of two strands (swl1, swl2) is disposed therein. One (swl1) of the two strands (swl) is connected to any one of both electrical contact pins of a button 220 (this is called a 'secondary button') provided on the side of the station unit 200. The other strand (swl2) is connected to one (cl2) of both specific signal lines cl1 and cl2 of the cable 30, which is connected to an external device, through a branch connector 31 wherein said both signal lines cl1 and cl2 are supposed to be electrical short when the transmission button (not shown) provided on the existing micrometer 110 is pressed, as described above. Further, the wire (swl) extends to the opening 211 along the guide groove 212, and then one strand (swl1) is connected to the anvil 111 (more specifically, to a conductive pin of the insulator 112) through the opening 211. The other strand (swl2) is bound to the frame by means of the fastener 113.

The other one (cl1) of said both signal lines cl1 and cl2 of the cable 30 extends, by means of the branch connector 31, to be connected to the other contact pin of the secondary button 220.

In case that the electrical connection is made as described above, even if a worker pushes the secondary button 220 to short-circuit both contact pins thereof without a conductive sample to be placed beside the anvil 111 of the existing micrometer after moving only the spindle to make a measurement value within the standard range, the specific signal lines cl1 and cl2 are not short-circuited because the anvil 111 and the spindle 114 are electrically open. Only in the event that a worker moves the spindle 114 to contact with a crimped terminal of conductive object while holding the crimped terminal in contact with the anvil 111, said both signal lines cl1 and cl2 of the cable 30 become short-circuited when he/she pushes the secondary button 220, so that an internal control unit of the existing micrometer 110 which detects this short-circuited state between the both lines cl1 and cl2 allows a current measured value, i.e., a current gap between the anvil and the spindle to be transmitted to an external device, e.g., a POP terminal via the connected cable 30, Since a worker cannot push a transmission button prepared originally on the existing micrometer 110 due to blocking of the wide plate portion 213 of the station unit 200 in case that the existing micrometer is mounted on the station unit 200 and used for sample measurements, it is possible to prevent the transmission of only a proper value to a POP terminal without actual measuring a conductive sample, as explained in the conventional problem.

Unless the various embodiments, for a micrometer for measuring the dimension of a conductive object, described so far are incompatible with each other, the explained embodiments can be properly chosen in various ways and then combined to embody the concept and idea of the present invention.

The embodiments of the present invention described above have been introduced for the purpose of illustration; therefore, it should be understood by those skilled in the art that modification, change, substitution, or addition to the embodiments is possible without departing from the technical principles and scope of the present invention defined by the appended claims.

What is claimed is:

1. A micrometer for measuring dimension of an object, comprising:
   a frame of conductive material;
   an anvil of conductive material that is fixedly coupled to one end of the frame in an electrically insulated manner from the frame;
   a spindle of conductive material coupled to other end of the frame in such a way as to be moved back and forth along direction of the anvil in synchronization with rotation of a thimble while making electrical contact with the frame; and
   a controller configured to transmit a value for current gap between the anvil and the spindle to an external device as a measurement in case the anvil and the frame are electrically short-circuited, the current gap being tracked according to distance the spindle travels.

2. The micrometer of claim 1, wherein the controller is further configured to transmit the value for the current gap between the anvil and the spindle to the external device as a measurement if the anvil and the frame are in electrically short-circuited when a press of a provided button is detected.

3. The micrometer of claim 1, further comprising a supplement member, provided with a button on one side thereof, configured to seat the frame fixedly,
   wherein one of both electrical pins of the button is electrically connected to one signal line of a cable connecting the micrometer and the external device, and other pin of said both electrical pins is electrically connected to one of the anvil and the frame, said both electrical pins being electrically short-circuited when the button is pressed, and
   wherein other one of the anvil and the frame is electrically connected to another signal line of the cable.

4. The micrometer of claim 3, wherein the controller is further configured to transmit the value for the current gap between the anvil and the spindle to the external device as a measurement when said one signal line and said another signal line are electrically short-circuited.

5. The micrometer of claim 1, wherein the controller is further configured to conduct an automatic transmission operation that transmits the value for the current gap between the anvil and the spindle to the external device as a measurement when an electrical short-circuited state between the anvil and the frame is maintained for a predetermined time.

6. The micrometer of claim 5, wherein the controller is configured to conduct the automatic transmission operation in case that a specific mode is set, and to transmit the value for the current gap between the anvil and the spindle to the external device as a measurement when a press of a provided button is detected in case that the specific mode is not set, and
   wherein the controller electrically short-circuits both particular signal lines of the cable connected to the external device when conducting the automatic transmission operation.

7. The micrometer of claim 1, further comprising a display unit, wherein the controller is further configured to display an error on the display unit as a positive or negative value, the error being corresponding to difference between a standard value given for dimension of the object to be measured and a numerical value that is the measurement.

8. The micrometer of claim 7, wherein the standard value is received from the external device, or the error is received from the external device.

\* \* \* \* \*